Patented Apr. 14, 1953

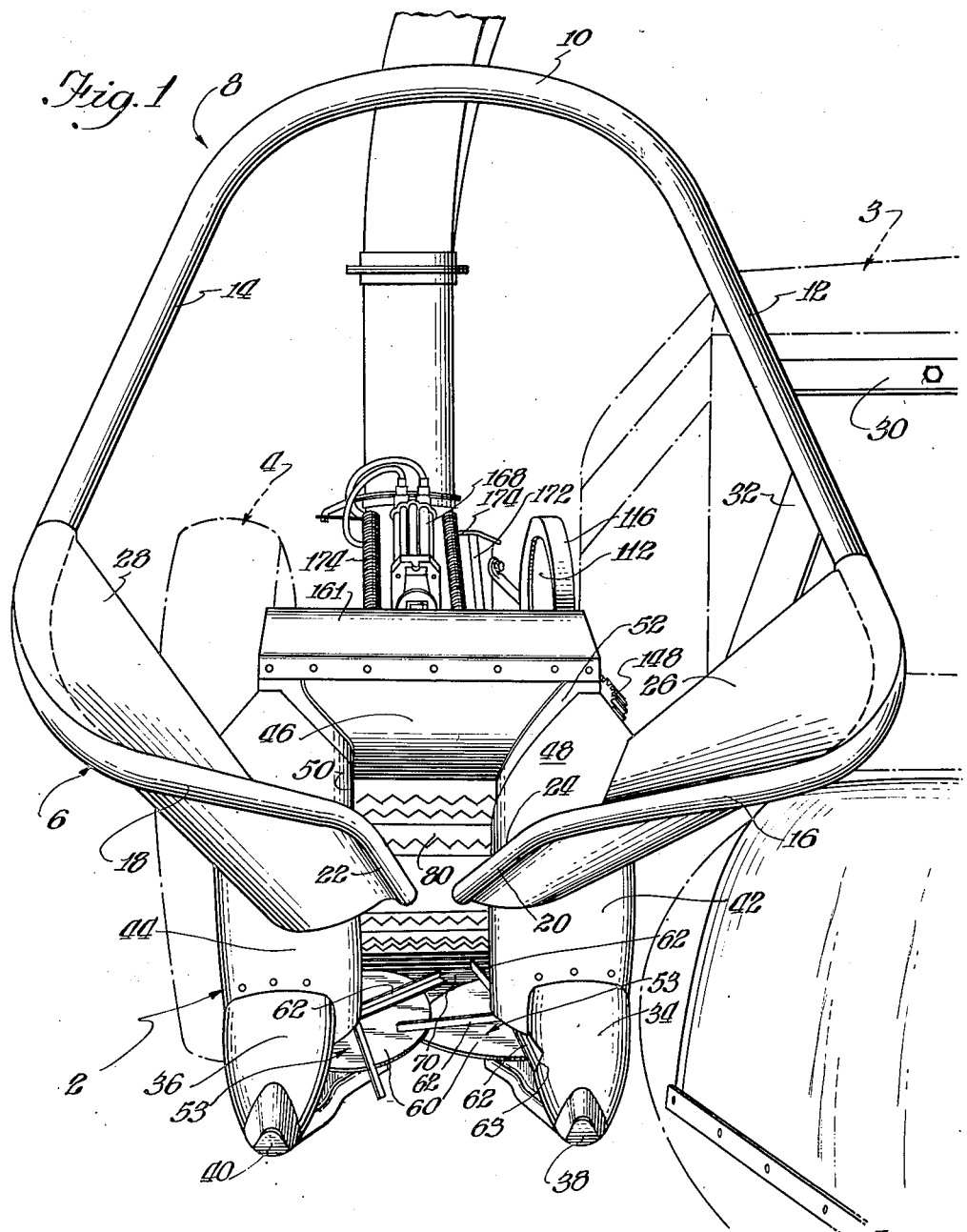

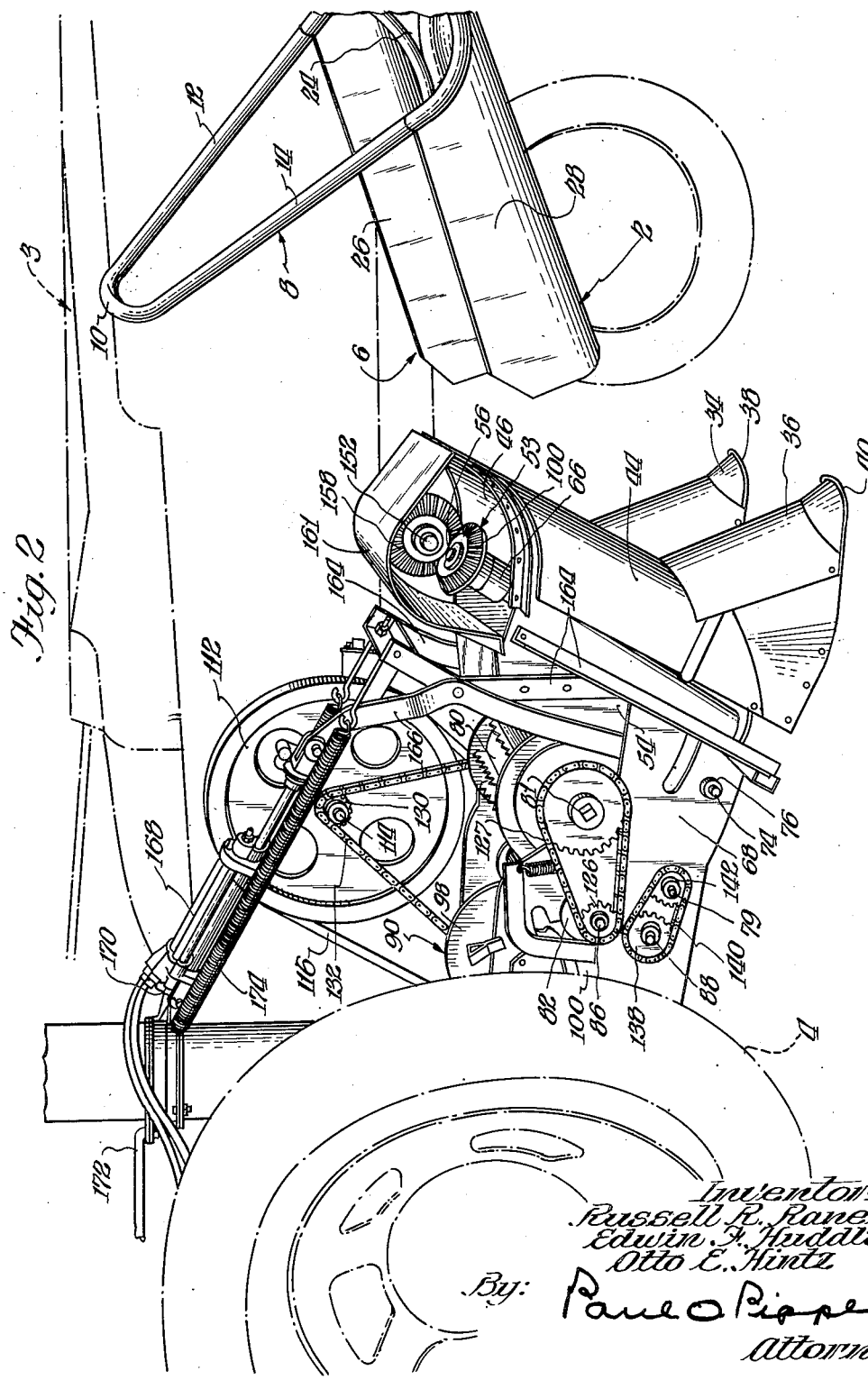

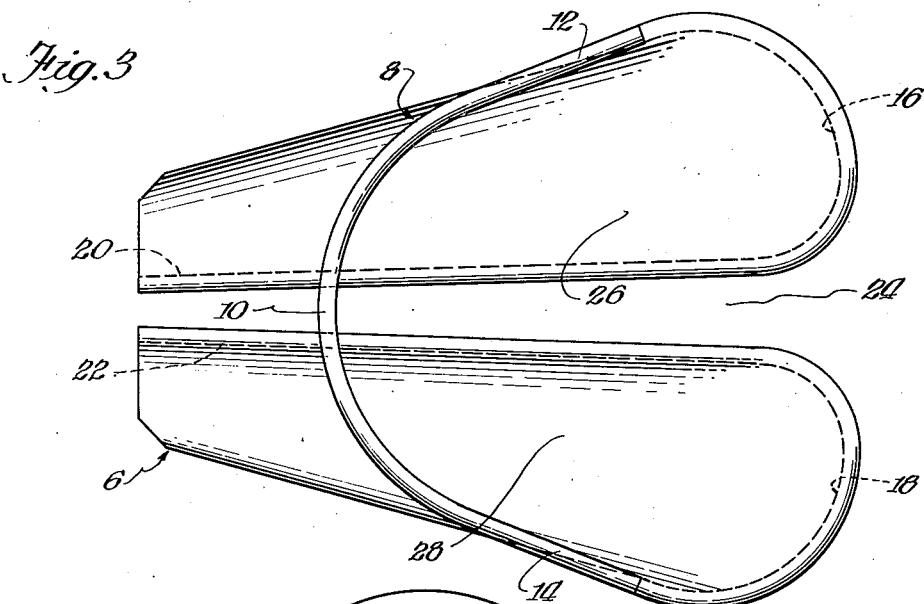
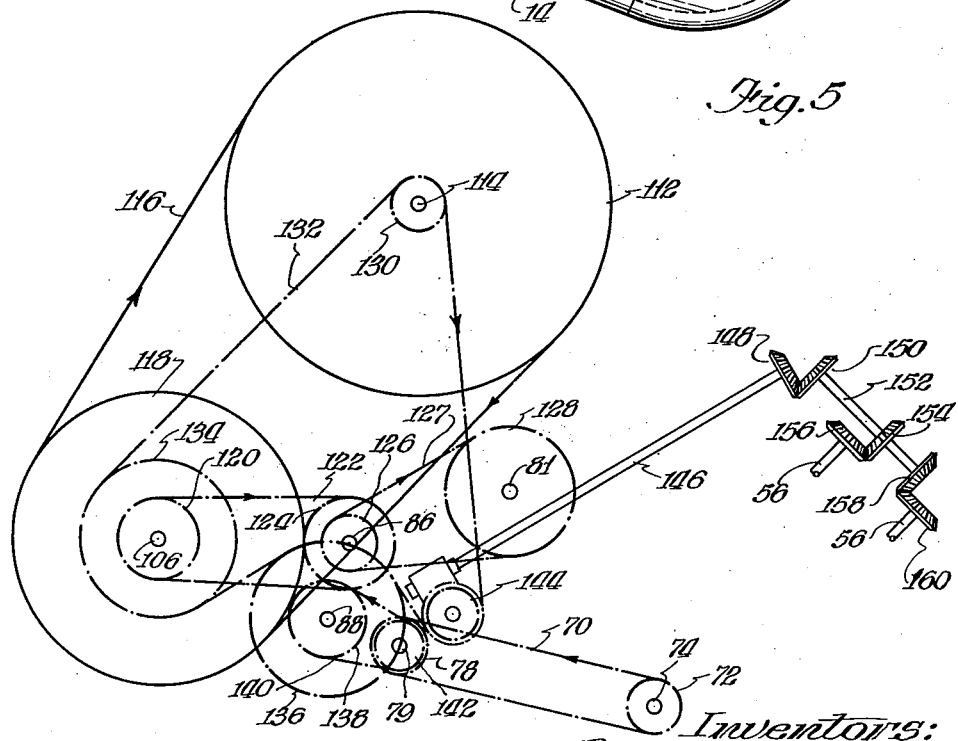

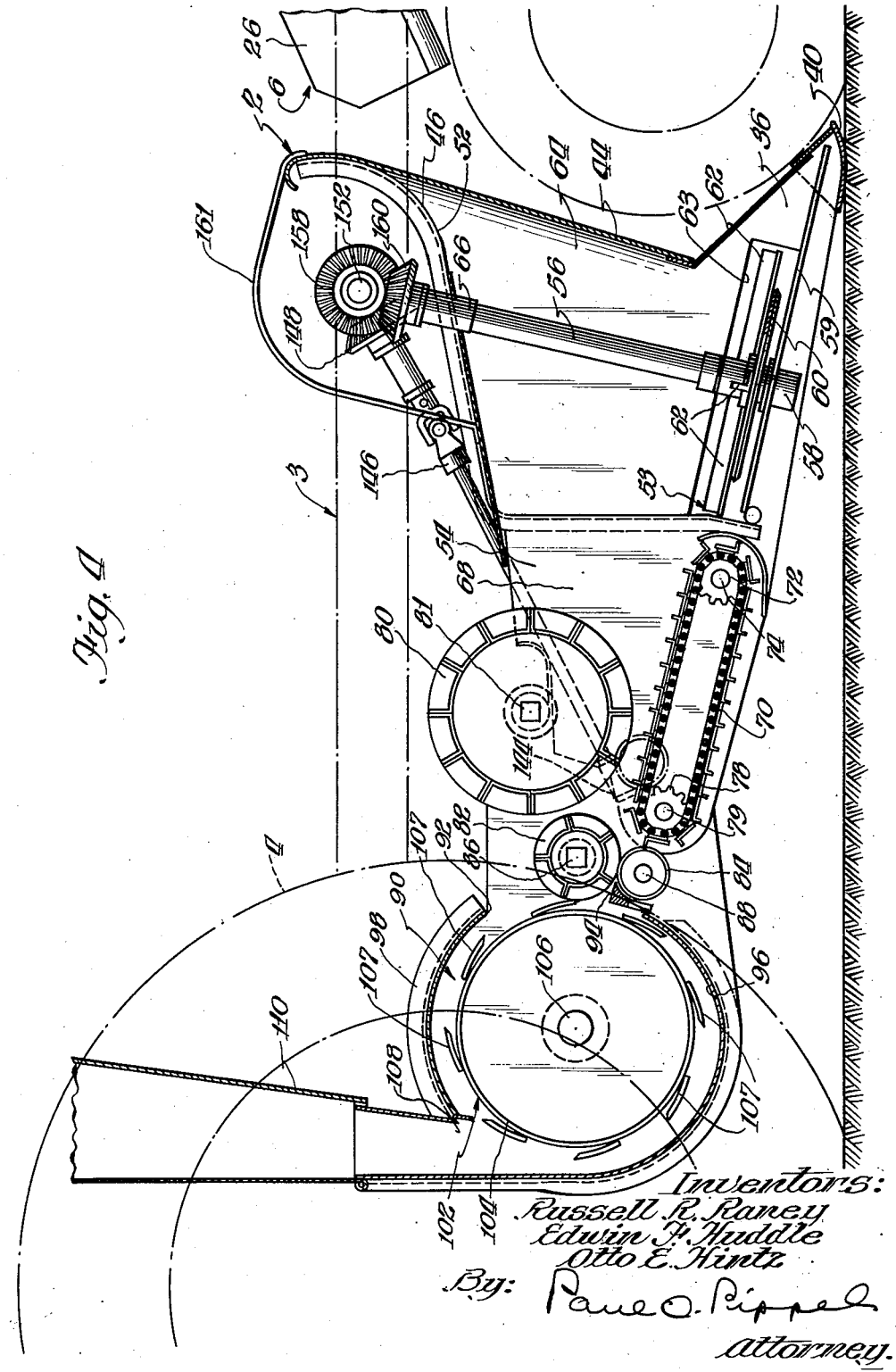

2,634,569

UNITED STATES PATENT OFFICE 2,634,569

STALK CROP HARVESTER

Russell R. Raney, Western Springs, Edwin F. Huddle, Elmwood Park, and Otto E. Hintz, Riverside, Ill., assignors to International Harvester Company, a corporation of New Jersey Application March 1, 1951, Serial No. 213,398

15 Claims. (Cl. 56—16)

1

This invention relates to harvesters and more specifically to machines for harvesting stalk crops growing in rows.

The accompanying drawings depict one form of a stalk crop harvesting machine commonly known as an ensilage harvester and specifically designed for operating on corn. The conventional corn harvester comprises severing means at the front end of a stalk receiving passage in which mechanism is arranged to accept the corn stalks in standing position after they are severed close to the ground from the roots and to advance the butt ends of the stalks rearwardly at a faster rate than the upper portions thereof so that theoretically the stalks present their butt ends first to the cutter of a reducing mechanism located at the rear end of the passage.

In reality, however, this theoretical desirability has not been entirely realized in practical embodiments.

A general object of the invention is to devise a simple, practical stalk crop harvester which attains the desired objectives.

A further object is to design such a harvester comprising a compact, light weight and efficient mechanism which is relatively inexpensive to manufacture.

A further object is to provide a harvester wherein the stalks are bent ahead of the severing means whereby as the machine is advanced toward each stalk, the butt ends thereof are entered first into the processing section of the machine.

A further object is to arrange the mechanism so that the stalks are prostrated before being severed and thus supported after severance and fed butt ends first to the conveyor delivering to the reducing mechanism.

A more specific object is to provide a support for the stalks in advance of the severing means, the support being designed to pass under and embrace the foliage of the corn stalk to support the plant off the ground in prostrated position after it is severed.

The invention contemplates a novel support structure having a forwardly flaring stalk-receiving passage flanked by foliage engaging and supporting trays which provide substantially smooth plant-supporting surfaces sloped downwardly rearwardly toward the mouth of the processing mechanism.

These and other objects of the invention will become more apparent from the specification and the drawings, wherein:

Figure 1 is a front perspective view of the novel tractor-mounted harvester.

2

Figure 2 is a fragmentary side perspective view thereof drawn to a smaller scale.

Figure 3 is a top plan view of the combined deflector and plant support structure shown in its operating position.

Figure 4 is a longitudinal vertical sectional view of the mechanism with the outboard panel removed and with parts broken away, and Figure 5 is a schematic view of the driving arrangement.

Describing the invention in detail, the harvester unit generally designated 2 is located at one side of a tractor providing a field traversing or ambulant support carrier structure 3 and supported in part in conventional manner from a rear axle housing between the body of the tractor and a laterally offset driving wheel 4 thereof as will be readily understood by those skilled in the art.

The unit 2 includes a forward plant bending and support structure 6, said structure comprising at its forward edge a yoke or arch bar member generally indicated 8 having an upper inverted U-shaped portion sloping downwardly forwardly, the U-shaped portion having a cross-bar 10 or deflector at its upper extremity from opposite ends of which depend inboard and outboard downwardly forwardly diverging legs 12 and 14. The lower extremities of legs 12 and 14 are bent arcuately inwardly toward each other to provide forwardly convexed guide portions 16 and 18 curvingly converging rearwardly at a relatively wide obtuse angle. These portions 16 and 18 may be straight, if desired. The inner or adjacent extremities of portions 16 and 18 curve more sharply at an acute angle rearwardly and then are continued in substantially straight lines to form condenser members 20 and 22, respectively, which slope downwardly and converge rearwardly to form a forwardly flaring plant receiving passage or guideway 24 therebetween. It will be noted that the lower portion of structure 6 has its leading edge extended a substantial distance ahead of the arch bar 10 and that the forward end of channel 24 is in advance of the bar 10 whereby the plant, such as corn, is unrestrictively directed by guide portions 16 and 18 to enter the forward end of passage 24 before the upper part of the plant is engaged by the bar 10.

As the machine is advanced toward the plant, the bar 10 bends the stalk forwardly and at the same time due to the narrowing of the passage 24 rearwardly, the foliage is gradually compressed. It will be appreciated that as the plant is being bent down, the foliage on the condenser members tends to be moved downwardly. This is accommodated somewhat by the downward rearward slope of the condenser members, however, the lowering of the foliage is resisted and it tends to bunch up and move above the condenser members and then spread out on the support platforms or sheet metal inboard and outboard panels or sections 26 and 28, each of which is convexed downwardly to provide a downwardly rearwardly sloping tray or bed for the plant. Each panel 26 and 28 is connected to the yoke 10 preferably by being rolled about the lower end of the related leg 12 or 14 and over the portion 16 or 18 and the condenser member 20 or 22. The panels may, of course, be welded or otherwise secured to the related members. The trays 26 and 28 provide top upwardly facing slide surfaces flanked by upstanding sides converging rearwardly to funnel the crop between the dividers.

The structure 6 is mounted on the tractor body as by brackets 30 and 32 connected to the inboard leg 12 of the bar and bolted or otherwise attached to adjacent portion of the body of the tractor.

The rear part or component of the harvester unit 2 is spaced rearwardly of the rear extremity of the gathering and supporting structure 6 and comprises laterally spaced inboard and outboard stublike dividers or running boards 34 and 36 with bottom shoes or runners 38 and 40 adapted to slide along the ground to support the forward section of said rear part of the machine. The dividers 34 and 36 are joined on their top sides adjacent to their rear ends to the lower ends of forwardly convexed shrouds or housings 42 and 44, respectively, said shrouds extending diagonally upwardly forwardly and at their upper ends being interconnected by a cross panel or roof plate 46 and forming a tunnel structure therewith. The dividers are pointed forwardly and the shroud members 42 and 44 provide guide faces or cheeks 48 and 50 respectively at the lateral sides of a mouth or inlet 52 leading into a stalk-receiving trough 54. The top of the mouth is convexed downwardly at its leading end by bowing the roof plate 46 which is then sloped downwardly rearwardly.

The mouth 52 contains intake means in the form of rotatable assemblies 53, 53 at opposite sides of the mouth thereof partially housed in the respective shrouds. Each assembly comprises a substantially upright slightly forwardly inclined shaft 56 having its lower end journaled in a bearing 58 carried by a bottom plate 59 of the related divider. The shaft 56 has secured thereto adjacent to its lower end a cutter disc 60 provided with radially extending fingers or propelling means 62. The discs or cutter means are inclined forwardly downwardly and project radially into the mouth through an opening 63 in the inner side of the related runner and cheek plate. The assemblies are rotated contradirectionally, the inboard assembly rotating clockwise and the outboard assembly counterclockwise. It will be understood that the inboard and outboard assemblies may be interchanged and the direction of rotation thereof reversed also one of the disks may be replaced with a non-cutting serrated disc.

The upper end of each shaft 56 may be journaled in a bearing 66 mounted on the roof plate 46.

The trough 54 may be open at the top and may comprise a sheet metal panel 68 at each side thereof and an endless slatted apron conveyor 70 at the bottom thereof extending between the panels 68. The apron moves longitudinally of the harvester unit and is rotatably supported at its front end by an idler roll 72 journaled on a substantially horizontal axis by a shaft 74 carried at each end in a suitable bearing 76 mounted on the adjacent side panel 68 of the trough. The rear end of the apron is trained on a driving roll 78 having a shaft 79 journaled at each end by means of a bearing carried on the adjacent side panel 68 of the trough. It will be seen that the apron is slightly inclined upwardly rearwardly and extends substantially perpendicular to the axis of shafts 56, 56 and has its forward end immediately to the rear and just clear of the cutter discs and fingers thereon.

A floating pick-up roll 80 is positioned above the apron, said roll being carried by a shaft 81 extending through bearings at each end (not shown) movably fitted into the side panels 68 of the trough to accommodate up and down movement of the roll 80 to pass uneven bunches of the forage. The feed roll maintains the forage upon the apron which discharges at its rear end between opposed top and bottom feed rolls 82 and 84 provided with shafts 86 and 88 respectively journaled on bearings carried by the side panels of the trough. The rolls 82 and 84 form receiving means for a reducing mechanism generally designated 90.

The reducing mechanism 90 comprises a drum casing having an inlet opening 92 at its forward side in back of the feed rolls 82 and 84. The lower lip of the opening 92 is provided with a transverse fixed cutter bar 94 secured to an arcuate circumferential panel 96 of the drum and side sheets 98 and 100 at the inboard and outboard ends of the drum, the panel 96 extending between and being connected to the sheets 98 and 100.

A drum type cutter head 102 comprising a knife and flinger arrangement is rotatably mounted within the drum casing. The cutter head 102 comprises a cylindrical member 104 with a center shaft 106 journaled in bearings carried by the side sheets 98 and 100.

The member 104 carries suitable knives 107 serving also as flingers, the knives cooperating with the cutter bar to cut the forage into suitable lengths as it is advanced into the opening 92, and to throw the cut forage through the discharge opening 108 in the top side of a peripheral panel 96 of the drum, said opening 108 communicating with a pipe or chute 110 adapted to discharge into a wagon as well known in the art.

The driving arrangement for the various rolls and shafts is shown diagrammatically in Figure 5. A pulley 112 is mounted on a power take-off shaft 114 extending horizontally from a side of the tractor adjacent the harvester unit 2. The pulley 112 drives a belt 116 trained thereon, said belt 116 being trained under a pulley 118 fixed on the inboard end of shaft 106 of the cutter head.

The inboard end of shaft 106 is also connected to another pulley 120 which drives a belt 122 which in turn drives a pulley 124 fixed to the inboard end of shaft 86 of the top feed roll 82. The outboard end of the shaft 86 is provided with a sprocket 126 driving a chain 127 trained on a sprocket 128 carried by the outboard end of shaft 81 of feed roll 80.

The power take-off shaft 114 is also provided with a sprocket 130 driving a chain 132 which passes under an idler gear 134 journaled on the inboard end of shaft 106 of the cutter head. The chain 132 passes over a sprocket 136 connected to the inboard end of shaft 88 of the bottom feed roll 84. The outboard end of shaft 88 is provided with a sprocket 138 driving a chain 140 trained on sprocket 142 connected to the outboard end of shaft 79 of the driving roll 78 of the apron 70. The chain 132 also drives a reduction worm and gear assembly 144 which is provided with a diagonal forwardly upwardly extending shaft 146 carrying at its upper end a bevel gear 148 which meshes with a bevel gear 150 connected to one end of a shaft 152 which is connected intermediate its ends to a bevel gear 154 driving a bevel gear 156 connected to the upper end of shaft 56 of the inboard assembly 53. Cross shaft 152, rotatably carried in a bearing (not shown) connected to the roof panel, is connected at its other end to a bevel gear 158 which meshes with a bevel gear 160 connected to the upper end of shaft 56 of the outboard assembly 53. The cross shaft 152 and the gearing thereon may be enclosed under a cover plate 161 fixed to the roof plate 46. The direction of rotation of the driving belts and chains is indicated by arrows in Figure 5.

In operation, the tractor with the harvester unit is driven along each row of corn. The forward section of the unit comprising the combined guide deflector and support structure operates in the following manner. The guide portions along the lower leading edge of this structure guide the stalk into the forward end of the flaring guide-way 24. After the stalk reaches a point directly underneath the cross bar 10, the upper part of the plant is bent forwardly while the lower part of the plant proceeds into the narrowing part of the guideway 24 whereupon the foliage at the lower part of the plant is compressed. The lower part of the plant then emerges from the rear end of the passageway 24 and due to the downwardly sloping nature of the passageway the foliage moves above the inner or rear end of the passageway 24 above the platforms 26 and 28. The butt end of the plant is then approached by the cutter discs of the assemblies 53, 53 which sever the partially prostrated plant whereupon its forward or upper end falls downwardly, the foliage thereof resting on the top sides of the trays 26 and 28, while the butt end of the plant is flung rearwardly upwardly by the flingers 62, which form intake or charging means of the processing mechanism, onto the top of the conveyor apron 70 beneath the floating pick-up roll 80, the conveyor apron discharging between the opposed rolls 82 and 84 which move the plant across the cutter bar whereupon the plant is shredded to desired lengths and flung by the knives 107 which throw the material through the opening 108 into the pipe 110 which discharges into the wagon. It will be seen that the rear ends of the trays with their rearwardly converging sides, as seen in Figs. 1 and 3, gravitationally funnel the plants to an area directly in front of the tunnel structure between the dividers and that the rear extremities of the trays are spaced a substantial distance ahead of the tunnel structure so that as each plant is moved off a tray it is whipped downwardly due to the inclination of the conveyor 70 and the direction of rotation of the roll 80 whereby the upper end of each stalk is dragged along the ground directly in front of the cutters thus sweeping any fallen ears of corn or other plant particles into the flingers 62 for movement thereby into the trough. Furthermore, the undersides of the trays which face downwardly and forwardly, as seen in Figure 1, provide secondary deflectors for immature plants or partially fallen stalks thereby partially bending them forwardly so that all the stalks may be generally aligned or oriented parallel to the line of draft of the machine and fed endwise into the tunnel structure and thereby prevent clogging. Inasmuch as the trays are convexed downwardly with the crest of curvature intermediate their lateral extremes, as best seen in Figure 1, they develop guide channels along the members 20 and 22 into which the upper ends of these bent or immature plants enter. These latter plants, of course, grow in or along the rows and therefore are in a position for such guidance.

The forward section of the rear part of the harvester is swingable vertically on the shaft 74 (Fig. 4) pivotally connecting the shrouds and structure carried thereby with the side panels 68 of the trough. The paneling of the forward section is connected to braces 164 which are connected to a lever assembly 166 pivoted at its lower end on the shaft 74 and at its upper end to the forward end of a hydraulic motor 168 which at its rear end is connected at 170 to the pipe 110 and bracing structure 172 thereof connected to suitable portions of the supporting tractor. Tension springs 174, 174 are arranged in parallel with motor 168 to provide a gentle letdown for the forward section and to assist the raising thereof by the motor.

What is claimed is:

1. In a corn harvester, an ambulant carrier, a forward corn stalk guide and support assembly connected to said carrier in a position to normally engage standing corn stalks intermediate the ends thereof, a harvesting component connected to said carrier behind said assembly in tandem therewith and including a forward tunnel structure with forwardly directed, laterally spaced dividers adapted to ride directly upon the ground for gathering fallen and broken plants from the ground into said tunnel structure, cutter means within the tunnel structure at the bottom thereof adapted to sever the stalks passing through the structure adjacent to the ground line, propelling means cooperatively associated with said cutter means for moving the stalks rearwardly into said tunnel structure, said assembly comprising a pair of laterally spaced longitudinally extending trays defining a plant passageway therebetween for guiding the stalk therethrough, a plant bending member disposed across said passageway at a level to engage the upper extents of the stalks passing through the passageway and adapted to bend the stalks forwardly as the harvester is propelled against the stalks to prostrate the stalks so as to present the butt ends thereof to the cutter means whereupon each stalk is severed by the cutter means and free to fall onto the tray thereadjacent, said trays being spaced at their rear extremities forwardly of said tunnel structure a distance sufficient to accommodate the upper ends of the stalks to drop off the trays to the ground as the stalks are advanced into the tunnel structure by said propelling means whereupon the upper ends of the stalks are caused to drag upon the ground and in cooperation with said propelling means to sweep plant particles laying upon the ground into said tunnel structure.

2. A row crop silage harvester comprising ambulant carrier means, fore and aft components arranged in tandem upon said carrier means and spaced longitudinally with respect to the line of draft of the harvester, said fore component including laterally spaced sections flanking a plant passageway therebetween, at least one of said sections presenting an upwardly facing, downwardly rearwardly sloping continuous surface spaced at its discharge extremity forwardly of said aft component and formed and arranged to funnel the crops to directly in front of said aft component, an arch bar connected to said carrier means and extending across the passageway at a level adapted to engage the upper extremities of stalks passing through the passageway to bend the same forwardly while the aft component is advanced upon the butt end of the stalk, said aft component including a forward tunnel structure with runners riding upon the ground and disposed laterally outwardly of the discharge extremity of said surface, cutter means within the tunnel structure adapted to sever the stalks entered into the tunnel structure adjacent to the ground whereupon each stalk is caused to fall forwardly downwardly upon said surface with the butt end thereof projected into said tunnel structure, and conveyor means within said structure feeding rearwardly thereinto and including an apron extending from said cutter means upwardly rearwardly for engaging the butt of each stalk as it is cut, and pulling the stalk off said surface whereupon the stalk is caused to lay upon the apron in a diagonally downward forward position with its upper end dragging upon the ground between the dividers while it is being moved rearwardly through said tunnel structure whereby sweeping the crop particles off the ground onto said apron.

3. In a row crop silage harvester, the combination with a stalk cutter, of a stalk bender spaced forward and above said cutter and operating to bend the stalks forward before they are cut and to hold the same bent forward while they are being cut, and a stalk supporter comprising a pair of trays located below the stalk bender and extending forwardly and rearwardly thereof above said stalk cutter in front thereof and between which the standing stalks are passed and onto which the stalks, after being cut, are caused to directly fall by said stalk bender, said trays sloping downwardly rearwardly and having upstanding rearwardly converging stalk-confining sides and providing slide surfaces for the stalk falling thereupon whereby under forward movement of the harvester the stalks upon the trays will gravitate rearwardly.

4. The combination with a row crop silage harvester comprising fore and aft components, of field-traversing carrier means supporting said components in spaced relation, said aft component including a structure with ground-engaging forwardly projecting runners for gathering crops laying upon the ground, cutting means within the structure for severing from the ground stalks entered into the structure, conveyor means within said structure arranged in receiving relationship to said cutter means for moving the stalks rearwardly from the cutter means, said forward component comprising a pair of laterally spaced trays flanking a plant passageway therebetween and positioned a substantial distance above the ground for engaging and guiding standing stalks to said passageway, a deflector extending across said passageway in a position to engage the upper parts of stalks and deflect the stalks forwardly under forward movement of the harvester and operating to hold the stalks bent forward while they are being cut whereupon the forwardly bent portions of the stalks are caused to fall onto an adjacent tray while the butt ends thereof are entered by said cutter means on the conveyor means, said trays sloping downwardly rearwardly and providing top surfaces upon which said stalks are caused to slide gravitationally rearwardly into said structure, the undersides of said trays facing downwardly and forwardly and effective to bend substantially forwardly immature plants or bent stalks which, when entered between the dividers and cut, will be aligned substantially parallel with the stalks carried by the trays for delivery to the conveyor means.

5. In an ensilage harvester, the combination with a stalk cutter, of a stalk bender located above and forwardly of the cutter and operating to bend the stalks forward while they are being cut, and a two part stalk support located above and forward of the cutter beneath the bender and having between the two parts thereof a passage through which standing stalks may pass under forward movement of the harvester, said two parts characterized by upwardly facing static surfaces sloping downwardly rearwardly to effect a gravitational rearward discharge of the stalks deposited thereupon.

6. A corn harvester according to claim 5, and said two parts further characterized by downwardly and forwardly facing surfaces engageable with plants passing therebeneath to bend the same forwardly and thus orient them in the same direction as those passing through the passageway.

7. For a harvester of the character described, the combination with an ambulant carrier, of a stalk supporter and deflector carried thereby and comprising two parts and having a passage therebetween through which standing stalks may pass under forward movement of the harvester, at least one of said parts including a tray positioned a substantial distance above the ground and sloping downwardly rearwardly and presenting on its upper side a slide surface for supporting stalks deposited thereupon for gravitationally discharging the same rearwardly, the tray further presenting a downwardly rearwardly sloping undersurface adapted to forwardly prostrate plants passing therebeneath and engaged thereby.

8. The combination according to claim 7 wherein said tray is bowed downwardly transversely to the line of draft of the harvester with the crest curvature disposed intermediate its lateral extremes.

9. For a plant harvester of the type described and having a plant engaging structure at its leading end, said structure comprising a yoke bar at its leading edge including an upper crosspiece extending transversely of the line of draft of the harvester, a leg at each end of the crosspiece sloping downwardly forwardly thereof, said legs being bent toward each other at their lower ends, and forming forwardly bowed guide portions, said portions being continued at their adjacent ends as rearwardly extending substantially straight sections converging and sloping downwardly rearwardly and defining a plant receiving passage therebetween, and a plant supporting tray at each side of the passage carried by said yoke bar.

10. A plant engaging structure of the type described comprising a bar having an upper cross-member adapted to be positioned at a level to engage the upper extents of standing stalks and legs sloping downwardly forwardly from opposite ends thereof, said legs being bent toward each other and presenting forwardly facing rearwardly curvingly converging guide portions along the lower part of the leading edge of said structure and spaced below the cross-member a distance to occupy a level to engage the intermediate section of standing stalks.

11. A structure according to claim 10 wherein the adjacent ends of said portions are extended rearwardly as substantially straight members converging rearwardly of said structure and defining a forwardly flaring plant receiving passage extending forwardly and rearwardly of the cross-member generally longitudinally of the line of draft of the structure.

12. For a harvester of the class described, the combination with an ambulant carrier, of a plant guide supported from the carrier and comprising a two part structure including a pair of laterally spaced transversely aligned longitudinal members defining a plant passageway therebetween, said members positioned at a level to engage at their forward extremities standing stalks intermediate the ends thereof and guide the same therealong, said members sloping downwardly rearwardly from their front extremities and progressively engaging lower and lower parts of the stalks as they pass through the passageway.

13. For a harvester of the type described, a plant support structure comprising a plurality of side-by-side parts defining a plant guideway therebetween sloping downwardly rearwardly of the structure, and presenting plant support surfaces alongside of said guideway sloping downwardly rearwardly.

14. For a harvester of the class described, the combination with an ambulant carrier, of a guide supported from the carrier and comprising a multipart structure including a pair of laterally spaced, transversely aligned, longitudinal members spaced a substantial distance off the ground and defining a plant passageway therebetween through which intermediate portions of standing stalks may pass for guidance between said members under forward movement of the harvester, a plant bender disposed intermediate the ends of the passageway across thereof at a level to engage the upper extremities of the stalks to bend the same forwardly while passing through said passageway, said members sloping downwardly rearwardly whereby they are considerably lower at their rear extremes than at their forward ends to prevent stripping off the foliage from the stalks as they are being bent.

15. The combination according to claim 14 wherein said members converge rearwardly whereby diminishing the lateral extent of the passageway in the direction toward the rear end thereof.

RUSSELL R. RANEY.
EDWIN F. HUDDLE.
OTTO E. HINTZ.

References Cited in the file of this patent

UNITED STATES PATENTS

| Number | Name | Date |
| --- | --- | --- |
| 1,165,758 | Cooke | Dec. 28, 1915 |
| 1,528,635 | Ronning et al. | Mar. 3, 1925 |
| 1,903,335 | Falkiner | Apr. 4, 1933 |
| 2,442,520 | Van Sickle | June 1, 1948 |
| 2,477,794 | Gehl | Aug. 2, 1949 |
| 2,553,855 | Haapala | May 22, 1951 |